US008300033B2

(12) United States Patent
Nam et al.

(10) Patent No.: US 8,300,033 B2
(45) Date of Patent: Oct. 30, 2012

(54) METHOD AND APPARATUS FOR DRIVING DISPLAY PANEL

(75) Inventors: Jang-Jin Nam, Gyeonggi-do (KR); Dong-Hoon Baek, Gyeonggi-do (KR)

(73) Assignee: Samsung Electronics Co., Ltd., Yeongtong-gu, Suwon-si Gyeonggi-do (KR)

( * ) Notice: Subject to any disclaimer, the term of this patent is extended or adjusted under 35 U.S.C. 154(b) by 887 days.

(21) Appl. No.: 12/126,286

(22) Filed: May 23, 2008

(65) Prior Publication Data

US 2008/0291181 A1 Nov. 27, 2008

(30) Foreign Application Priority Data

May 23, 2007 (KR) ........................ 10-2007-0050259

(51) Int. Cl.
*G06F 3/038* (2006.01)

(52) U.S. Cl. ........................................................ 345/204

(58) Field of Classification Search .................. 345/204, 345/82, 87

See application file for complete search history.

(56) References Cited

U.S. PATENT DOCUMENTS 6,665,742 B2 12/2003 Owen et al.
6,756,951 B1 * 6/2004 Ishizuka et al. ................. 345/82
2002/0060655 A1 * 5/2002 Moon ............................ 345/87
2002/0075249 A1 * 6/2002 Kubota et al. ................. 345/204
2003/0107535 A1 * 6/2003 Numao .......................... 345/76
2003/0197667 A1 * 10/2003 Numao .......................... 345/82
2004/0008074 A1 * 1/2004 Takehara et al. .............. 327/524
2004/0208047 A1 * 10/2004 Jo ................................ 365/145
2004/0252112 A1 * 12/2004 Fukuda et al. ................ 345/204
2005/0024353 A1 * 2/2005 Amundson et al. ........... 345/204
2005/0152189 A1 * 7/2005 Kim et al. ................ 365/185.29
2006/0022920 A1 * 2/2006 Lee ................................ 345/87
2006/0152465 A1 * 7/2006 Kao .............................. 345/100
2006/0203138 A1 * 9/2006 Chen et al. ...................... 349/39
2006/0222131 A1 * 10/2006 Park ............................. 375/355
2006/0256099 A1 * 11/2006 Tashiro ......................... 345/204

(Continued)

FOREIGN PATENT DOCUMENTS

KR 2005-0064568 6/2005

(Continued)

OTHER PUBLICATIONS

English language abstract of Korean Publication No. 2005-0064568.
English language abstract of Korean Publication No. 2007-0006580.

*Primary Examiner* — Joe H Cheng

(74) *Attorney, Agent, or Firm* — Muir Patent Consulting, PLLC

(57) ABSTRACT

A method and apparatus for driving a display panel in which a bus link between a timing controller and a source driver block is altered in order to simplify the structure of a circuit. The apparatus includes a timing controller to generate signals including data and a reference signal for driving the display panel at a display driving time. A plurality of source drivers generate signals for driving data lines of the display panel using the signals generated by the timing controller. First signal transmission means are provided for transmitting the data from the timing controller to each of the plurality of source drivers using a point-to-point connection link, and a bus for transmitting the reference signal generated by the timing controller to one of the plurality of source drivers. Also, second signal transmission means are provided for transmitting the reference signal between the plurality of source drivers using a serial cascade connection link.

23 Claims, 7 Drawing Sheets

U.S. PATENT DOCUMENTS

2007/0171161 A1* 7/2007 Lin .................................. 345/87
2007/0195048 A1* 8/2007 Nam et al. ....................... 345/98
2007/0236423 A1* 10/2007 Chiou et al. .................... 345/76
2008/0001898 A1* 1/2008 Chang ........................... 345/100
2008/0001944 A1* 1/2008 Chang ........................... 345/214
2008/0018639 A1* 1/2008 Welbers et al. ............... 345/212
2008/0174539 A1* 7/2008 Hu et al. ......................... 345/99

FOREIGN PATENT DOCUMENTS

KR 2007-0006580 1/2007

* cited by examiner

METHOD AND APPARATUS FOR DRIVING DISPLAY PANEL

CROSS-REFERENCE TO RELATED PATENT APPLICATION

This application claims the benefit of Korean Patent Application No. 10-2007-0050259, filed on May 23, 2007, in the Korean Intellectual Property Office, the disclosure of which is incorporated herein in its entirety by reference.

BACKGROUND OF THE INVENTION

1. Field of the Invention

The present invention relates to a method and apparatus for driving a display panel, and more particularly, to a method and apparatus for driving a display panel in which a bus link between a timing controller and a source driver block is altered in order to simplify the structure of a circuit.

2. Description of the Related Art

Korean Patent Laid-Open Publication No. 2005-0064568 and U.S. Pat. No. 6,665,742 that are related to the present invention were disclosed.

FIG. 1 is a circuit diagram of a conventional apparatus 100 for driving a display panel 110, such as a liquid crystal display (LCD) panel. Referring to FIG. 1, the conventional apparatus 100 for driving the display panel 110 typically comprises the display panel 110, a printed circuit board (PCB) 130, which provides a place to mount a timing controller 120, and a film 140 that couples the display panel 110 and the PCB 130. Three source drivers SD1, SD2, and SD3 for driving the display panel 110 are mounted on the film 140.

In a bus link illustrated in FIG. 1, the timing controller 120 transmits data D1, D2, and D3 and control signals CLK, DIO, and IREF to the first source driver SD1. A power line and a gamma signal line are coupled to all the source drivers SD1, SD2, and SD3.

After receiving the data D1, D2, and D3 and control signals CLK, DIO, and IREF, the first source driver SD1 transmits data D2 and D3 and control signals CLK, DIO2, and IREF to the second source driver SD2 through buses that are cascaded together.

After receiving the data D2 and D3 and control signals CLK, DIO2, and IREF, the second source driver SD2 transmits data D3 and control signals CLK, DIO3, and IREF to the third source driver SD3 through buses that are cascaded together.

In order to transmit signals according to the bus link of FIG. 1, each source driver needs a transmission circuit to transmit data and control signals to source drivers that are cascaded together, and a reception circuit to receive the data and control signals. This, however, increases the area of source drivers and power consumption. Furthermore, each source driver additionally needs a delay locked loop (DLL) circuit to reproduce a clock signal necessary for the transmission of the data and control signals.

SUMMARY OF THE INVENTION

Embodiments of the present invention provide a method and apparatus for driving a display panel in which a bus link is altered in order to simplify the structure of a source driver circuit.

According to an aspect of the present invention, there is provided an apparatus for driving a display panel, which may comprise: a timing controller structured to generate first and second signals to drive the display panel; a plurality of source drivers to drive data lines of the display panel, at least one of the source drivers being structured to directly receive the first signal from the timing controller, the remaining source drivers being structured to indirectly receive the first signal from the timing controller, wherein the timing controller is structured to directly transmit the second signal to each of the plurality of source drivers.

According to another aspect of the present invention, the first signal may be a reference signal and the second signal may include data signals, and wherein the plurality of source drivers are structured to drive the data lines of the display panel responsive to the first and second signals.

Some embodiments of the present invention may include first signal transmission means comprising buses for transmitting the second signal including the data signals from the timing controller to each of the plurality of source drivers using a point-to-point connection link, and a bus for transmitting the first signal including the reference signal generated by the timing controller to one of the plurality of source drivers; and second signal transmission means comprising buses for transmitting the first signal including the reference signal between the plurality of source drivers using a serial cascade connection link The second signal may include a clock signal and a first control signal, and the first signal transmission means may further comprise: buses for transmitting the second signal including the clock signal and the first control signal between the timing controller and each of the plurality of source drivers using the point-to-point connection link.

The first control signal may comprise a data start signal, and the reference signal may comprise a reference current signal.

The timing controller may control a phase between the data and the clock signal so that a phase difference between the data and the clock signal maintains a specific value other than 0, and the maintained specific value may be 90°.

Each of the plurality of source drivers may comprise a reception circuit receiving the data, the clock signal, and the data start signal, and a transmission circuit and a reception circuit transmitting/receiving the reference signal.

Each of the plurality of source drivers may comprise: at least two transmission/reception circuits structured to transmit/receive the first signal; a copy circuit structured to copy the first signal received through at least one of the transmission/reception circuits and to generate a reference voltage equivalent to the copied first signal; a data reception circuit structured to detect the second signal directly transmitted from the timing controller using the reference voltage generated by the copy circuit.

The transmission/reception circuits may operate as the transmission circuit or the reception circuit according to the logic state of a control signal applied thereto.

In some embodiments, the apparatus for driving a display panel may comprise: a first group of buses structured to transmit first display data between a timing controller and a first source driver, the first display data being driven by the first source driver through one or more data lines coupled to the display panel; a single bus structured to transmit a reference signal between the timing controller and the first source driver; a second through an $n^{th}$ group of buses structured to directly transmit second through $n^{th}$ display data, respectively, between the timing controller and one of second through $n^{th}$ source drivers, the second through $n^{th}$ display data being respectively driven by the second through $n^{th}$ source drivers through the one or more data lines coupled to the display panel; and a group of clock buses, each clock bus structured to directly transmit a clock signal between the timing controller and one of the source drivers.

The apparatus may also include a first cascaded bus structured to transmit the reference signal from the first source driver to the second source driver that is serially cascaded to the first source driver; and a second through an $(n-1)^{th}$ cascaded bus structured to transmit the reference signal reproduced in second through $(n-1)^{th}$ source drivers.

The plurality of source drivers may have a chip-on film (COF) structure where the plurality of source drivers is mounted on a film connecting a printed circuit board (PCB) on which the timing controller is mounted and the display panel, or has a chip-on glass (COG) where the plurality of source drivers is mounted on a glass to which the display panel is coupled.

According to another aspect of the present invention, there is provided an apparatus for driving a display panel, which may comprise: a timing controller generating signals including data and a reference signal for driving the display panel at a display driving time; a first source driver block comprising a plurality of source drivers generating signals for driving data lines of the display panel using the signals generated by the timing controller; a second source driver block comprising a plurality of source drivers generating signals driving data lines of the display panel using the signals generated by the timing controller; a 1-1 signal transmission means comprising buses transmitting the data from the timing controller to each of the plurality of source drivers of the first source driver block using a point-to-point connection link, and a bus transmitting the reference signal generated by the timing controller to one of the plurality of source drivers of the first source driver block; a 1-2 signal transmission means comprising buses transmitting the data from the timing controller to each of the plurality of source drivers of the second source driver block using the point-to-point connection link, and a bus transmitting the reference signal generated by the timing controller to one of the plurality of source drivers of the second source driver block; a 2-1 signal transmission means comprising buses transmitting the reference signal between the plurality of source drivers of the first source driver block using a serial cascade connection link; and a 2-2 signal transmission means comprising buses transmitting the reference signal between the plurality of source drivers of the second source driver block using the serial cascade connection link.

The 1-1 signal transmission means may further comprise: buses transmitting a clock signal and a first control signal among the signals driving the display panel from the timing controller to each of the plurality of source drivers of the first source driver block using the point-to-point connection link, wherein the 1-2 signal transmission means further comprises: buses transmitting the clock signal and the first control signal among the signals driving the display panel from the timing controller to each of the plurality of source drivers of the second source driver block using the point-to-point connection link.

The first source driver block and the second source driver block may be disposed between the display panel and the PCB and have the timing controller therebetween in order to symmetrically face each other.

The 1-1 signal transmission means and the 1-2 signal transmission means may further comprise: buses transmitting the clock signal and the first control signal among the signals driving the display panel from the timing controller to each of the plurality of source drivers of the first and second source driver blocks using the point-to-point connection link.

According to another aspect of the present invention, there is provided a method of driving a display panel, which may comprise: a timing controller generating signals including data and a reference signal for driving the display panel at a display driving time; transmitting the data and predefined signals to each of source drivers included in a source driver block using buses according to a point-to-point connection link that couples the timing controller and each source driver included in the source driver block, and transmitting the reference signal generated by the timing controller to a first source driver among the source drivers included in the source driver block; transmitting the reference signal that is transmitted to the first source driver to the other source drivers included in the source driver block using buses according to a serial cascade connection link that couples the source drivers included in the source driver block; and generating signals to be applied to data lines of the display panel using the data, the predefined signals, and the reference signal that are transmitted to each of the source drivers included in the source driver block.

According to another aspect of the present invention, there is provided a method of driving a display panel, which may comprise: a timing controller generating signals including data and a reference signal for driving the display panel at a display driving time; transmitting the data and predefined signals to each of source drivers included in first and second source driver blocks using buses according to a point-to-point connection link that couples the timing controller and each source driver included in the first and second source driver blocks, transmitting the reference signal generated by the timing controller to a 1-1 source driver among the source drivers included in the first source driver block, and transmitting the reference signal generated by the timing controller to a 2-1 source driver among the source drivers included in the second source driver block; transmitting the reference signal that is transmitted to the 1-1 source driver to the other source drivers included in the first source driver block using buses according to a serial cascade connection link that couples the source drivers included in the first source driver block, and transmitting the reference signal that is transmitted to the 2-1 source driver to the other source drivers included in the second source driver block using buses according to the serial cascade connection link that couples the source drivers included in the second source driver block; and generating signals to be applied to data lines of the display panel using the data, the predefined signals, and the reference signal that are transmitted to each of the source drivers included in the first and second source driver blocks.

According to some embodiments, the predefined signals may comprise a clock signal and a first control signal. The first control signal may comprise a data start signal. The timing controller may control a phase between the data and the clock signal so that a phase difference between the data and the clock signal maintains a specific value other than 0. The maintained specific value may be 90°.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating preferred embodiments of the present invention are referred to in order to gain a sufficient understanding of the present invention, the merits thereof, and the objectives accomplished by the implementation of the present invention.

Hereinafter, the present invention will be described more fully with reference to the accompanying drawings, in which exemplary embodiments of the invention are shown.

Figure 2:
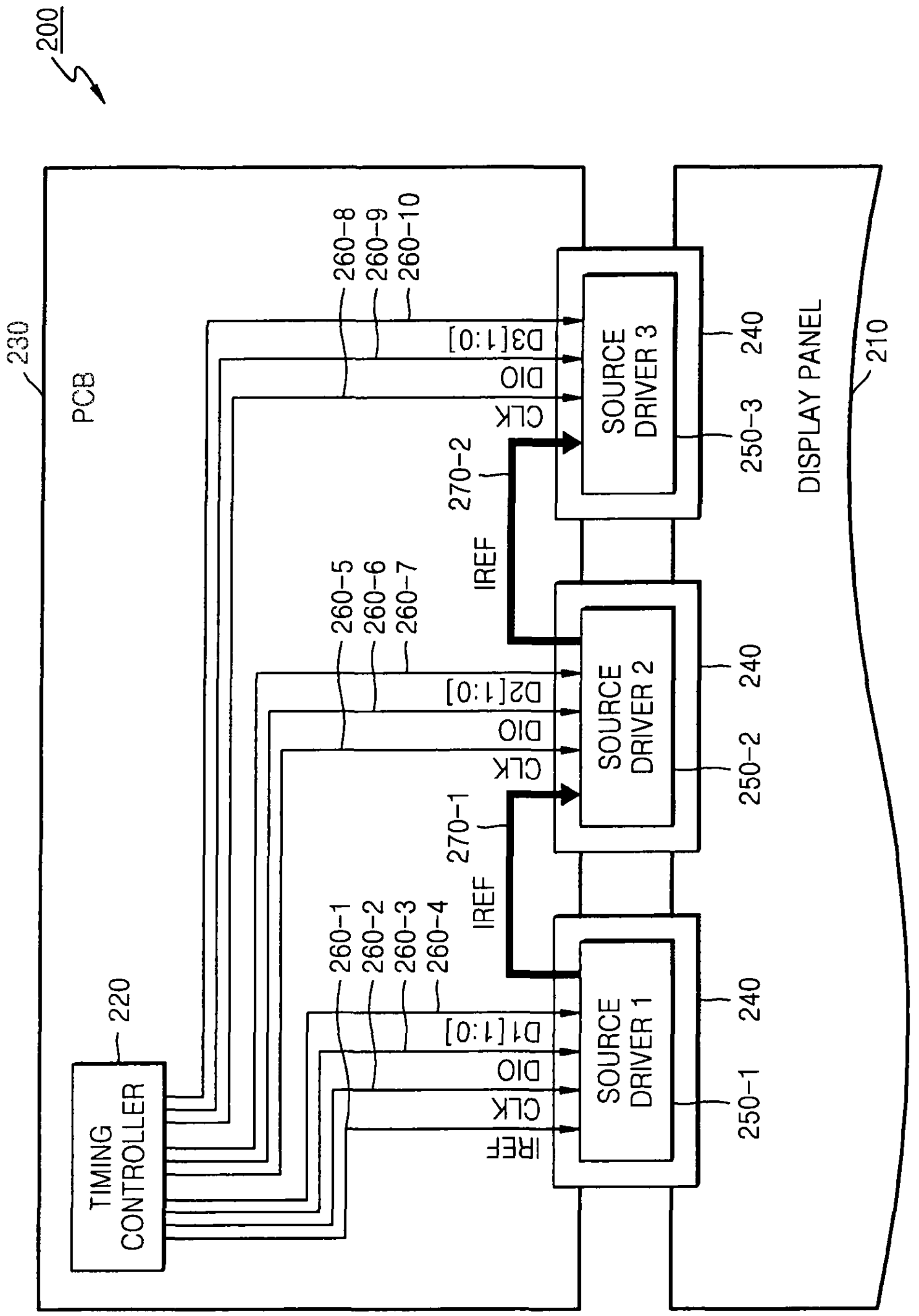
FIG. 2 is a circuit diagram including an apparatus for driving a display panel according to an embodiment of the present invention.

FIG. 2 is a circuit diagram including an apparatus 200 for driving a display panel 210 according to an embodiment of the present invention. Referring to FIG. 2, the apparatus 200 for driving the display panel 210 may comprise the display panel 210, a printed circuit board (PCB) 230, which may provide a place to mount a timing controller 220, and a film 240 that couples the display panel 210 and the PCB 230. Three source drivers 250-1, 250-2, and 250-3 for driving the display panel 210 may be mounted on the film 240.

The timing controller 220 may output signals necessary for driving the display panel 210 at a predefined time. The timing controller 220 may output a variety of signals including a clock signal CLK, a first control signal DIO, and a reference signal IREF. In particular, the timing controller 220 may control data and the clock signal CLK to have a 90° phase difference therebetween.

In the present embodiment, three source drivers 250-1, 250-2, and 250-3 are illustrated, but the present invention is not necessarily restricted thereto. For descriptive convenience, gate drivers, power lines, and gamma signal lines are omitted.

In a bus link as illustrated in FIG. 2, the reference signal IREF may be transmitted to each of the source drivers 250-1, 250-2, and 250-3 using a serial cascade connection link. Conversely, the clock signal CLK, the first control signal DIO, and other signals D1, D2, and D3 may be directly transmitted from the timing controller 220 to each of the source drivers 250-1, 250-2, and 250-3 using a point-to-point connection link.

In the serial cascade connection link used to transmit the reference signal IREF, each of the source drivers 250-1, 250-2, and 250-3 need not directly receive the reference signal IREF from the timing controller 220. But the first source driver 250-1 may directly receive the reference signal IREF from the timing controller 220, and each of the source drivers 250-2 and 250-3 may receive the reference signal IREF from the source driver in each previous stage.

In the point-to-point connection link, output pin ports of the source drivers 250-1, 250-2, and 250-3, which are allocated to the timing controller 220, and input pin ports for the signals CLK, DIO, and D1, D2, and D3 of the source drivers 250-1, 250-2, and 250-3 may be matched on a one-to-one basis.

Signal transmission means may be divided into first signal transmission means comprising buses 260-1 through 260-10 that directly couple the timing controller 220 and the source drivers 250-1, 250-2, and 250-3 using the point-to-point connection link, and second signal transmission means comprising buses 270-1 and 270-2 that couple the source drivers 250-1, 250-2, and 250-3 using the serial cascade connection link.

The first signal transmission means will now be described. A reference signal bus 260-1 may transmit the reference signal IREF generated by the timing controller 220 to the first source driver 250-1. A clock bus 260-2 transmits the clock signal CLK generated by the timing controller 220 to the first source driver 250-1. A control bus 260-3 transmits the first control signal DIO generated by the timing controller 220 to the first source driver 250-1. A data bus 260-4 transmits data D1 generated by the timing controller 220 to the first source driver 250-1 that is to process the data D1. The reference signal IREF may be a reference current signal used to detect a received signal.

A clock bus 260-5 transmits the clock signal CLK generated by the timing controller 220 to the second source driver 250-2. A control bus 260-6 transmits a first control signal DIO generated by the timing controller 220 to the second source driver 250-2. A data bus 260-7 transmits data D2 generated by the timing controller 220 to the second source driver 250-2 that is to process the data D2.

A clock bus 260-8 transmits the clock signal CLK generated by the timing controller 220 to the third source driver 250-3. A control bus 260-9 transmits a first control signal DIO generated by the timing controller 220 to the third source driver 250-3. A data bus 260-10 transmits data D3 generated by the timing controller 220 to the third source driver 250-3 that is to process the data D3.

The timing controller 220 may control the data D1, D2, and D3 and the clock signal CLK, which may be transmitted to the source drivers 250-1, 250-2, and 250-3, to have a 90° phase difference therebetween.

A reference signal bus 270-1 of the second signal transmission means transmits a reference signal IREF generated by the first source driver 250-1 to the second source driver 250-2 that is serially cascaded to the first source driver 250-1. A reference signal bus 270-2 of the second signal transmission means transmits a reference signal IREF generated by the second source driver 250-2 to the third source driver 250-3 that is serially cascaded to the second source driver 250-2.

In the bus link as illustrated in FIG. 2, each of the source drivers 250-1, 250-2, and 250-3 may include transmission/reception circuits for transmitting/receiving the reference signal IREF. The source drivers 250-1, 250-2, and 250-3 may include a reception circuit for receiving the data D1, D2, or D3, the clock signal CLK, and the first control signal DIO. But the source drivers do not need a transmission circuit for transmitting the signals. Furthermore, each of the source drivers 250-1, 250-2, and 250-3 does not need a delay locked loop (DLL) circuit for reproducing the clock signal CLK. Therefore, each of the source drivers 250-1, 250-2, and 250-3 includes a simplified circuit, resulting in a reduction of circuit size and power consumption.

Figure 3:
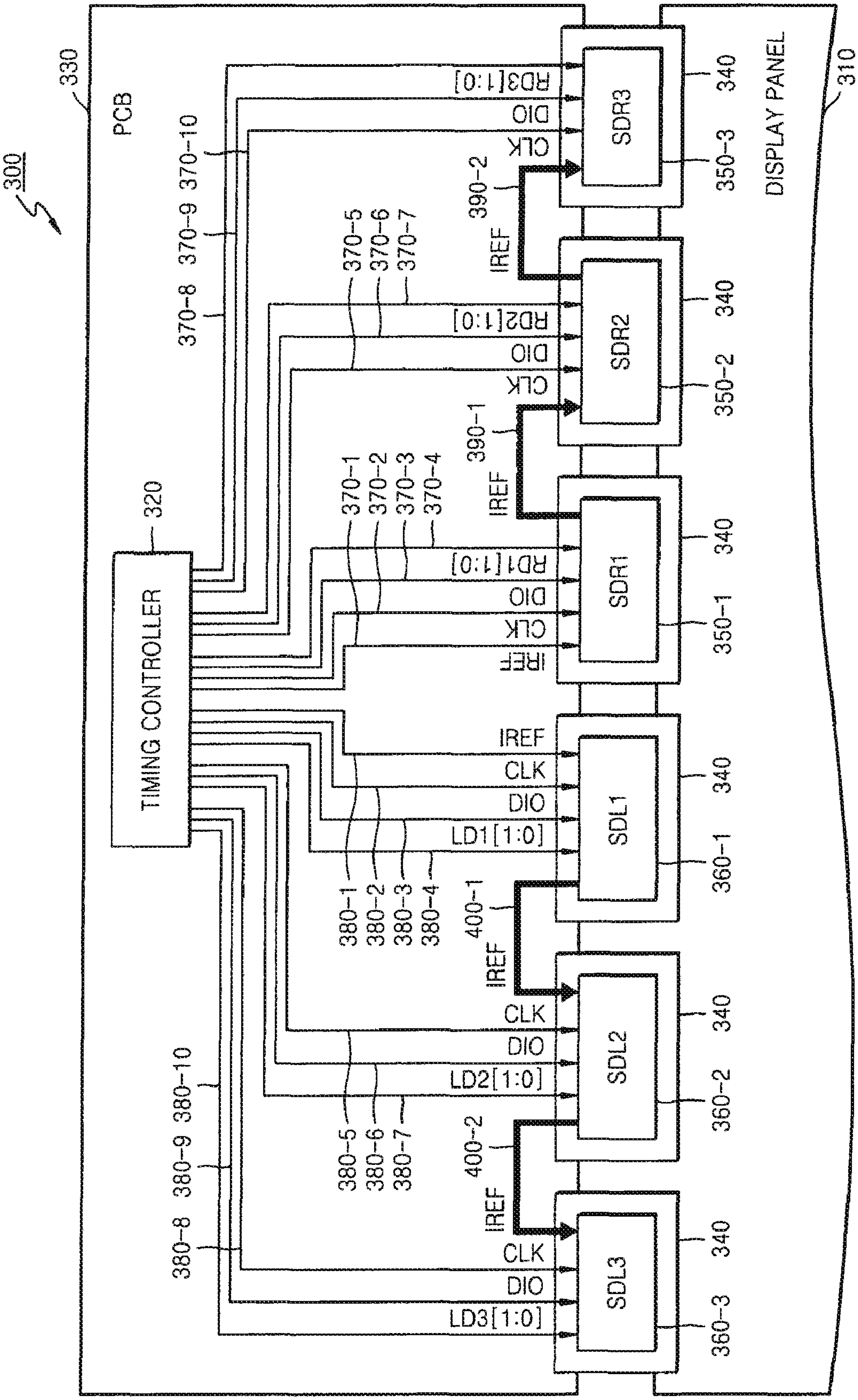
FIG. 3 is a circuit diagram illustrating an apparatus for driving a display panel according to another embodiment of the present invention.

FIG. 3 is a circuit diagram illustrating an apparatus 300 for driving a display panel 310 according to another embodiment of the present invention. Referring to FIG. 3, the apparatus 300 for driving the display panel 310 may comprise the display panel 310, a PCB 330, which may provide a place to mount a timing controller 320, and a film 340 that couples the display panel 310 and the PCB 330. Three source drivers 350-1, 350-2, and 350-3, which are included in a first source driver block 350, and three source drivers 360-1, 360-2, and 360-3, which are included in a second source driver block 360, for driving the display panel 310, may be mounted on the film 340.

The first source driver block 350 and the second source driver block 360 may be disposed between the display panel 310 and the PCB 330. The timing controller 320 may be disposed between the first and second driver blocks in a symmetrically facing manner.

The timing controller 320 outputs signals necessary for driving the display panel 310 at a predefined time. In more detail, the timing controller 320 may output a variety of signals including a clock signal CLK, a first control signal DIO, and a reference signal IREF. In particular, the timing controller 320 may control data and the clock signal CLK to have a 90° phase difference therebetween.

In a bus link as illustrated in FIG. 3, the reference signal IREF may be transmitted to each of the source drivers 350-1, 350-2, and 350-3 of the first source driver block 350 and the source drivers 360-1, 360-2, and 360-3 of the second source driver block 360 using a serial cascade connection link. The clock signal CLK, the first control signal DIO, and other signals D1, D2, and D3 may be directly transmitted from the timing controller 320 to each of the source drivers 350-1, 350-2, and 350-3 of the first source driver block 350 and the source drivers 360-1, 360-2, and 360-3 of the second source driver block 360 using a point-to-point connection link.

Signal transmission means are divided into four transmission means: first, 1-1 signal transmission means comprising buses 370-1 through 370-10 that directly couple the timing controller 320 and the source drivers 350-1, 350-2, and 350-3 of the first source driver block 350 using the point-to-point connection link; second, 1-2 signal transmission means comprising buses 380-1 through 380-10 that directly couple the timing controller 320 and the source drivers 360-1, 360-2, and 360-3 of the second source driver block 360 using the point-to-point connection link; third, 2-1 signal transmission means comprising buses 390-1 and 390-2 that couple the source drivers 350-1, 350-2, and 350-3 of the first source driver block 350 using the serial cascade connection link; and fourth, 2-2 signal transmission means comprising buses 400-1 and 400-2 that couple the source drivers 360-1, 360-2, and 360-3 of the second source driver block 360 using the serial cascade connection link.

The 1-1 signal transmission means will now be described. A reference signal bus 370-1 may transmit the reference signal IREF generated by the timing controller 320 to the first source driver SDR1 350-1 of the first source driver block 350. A clock bus 370-2 may transmit the clock signal CLK generated by the timing controller 320 to the first source driver SDR1 350-1. A control bus 370-3 may transmit the first control signal DIO generated by the timing controller 320 to the first source driver SDR1 350-1. A data bus 370-4 may transmit data D1 generated by the timing controller 320 to the first source driver SDR1 350-1 that is to process the data D1. The reference signal IREF may be a reference current signal used to detect a received signal.

A clock bus 370-5 may transmit the clock signal CLK generated by the timing controller 320 to the second source driver SDR2 350-2 of the first source driver block 350. A control bus 370-6 may transmit the first control signal DIO generated by the timing controller 320 to the second source driver SDR2 350-2. A data bus 370-7 may transmit data D2 generated by the timing controller 320 to the second source driver SDR2 350-2 that is to process the data D2.

A clock bus 370-8 may transmit the clock signal CLK generated by the timing controller 320 to the third source driver SDR3 350-3. A control bus 370-9 may transmit the first control signal DIO generated by the timing controller 320 to the third source driver SDR3 350-3. A data bus 370-10 may transmit data D3 generated by the timing controller 320 to the third source driver SDR3 350-3 that is to process the data D3.

Buses 380-1 through 380-10 included in the 1-2 signal transmission means may directly transmit the signals generated by the timing controller 320 to the source drivers SDL1, SDL2, and SDL3 360-1, 360-2, and 360-3 of the second source driver block 360, in the same manner as the buses 370-1 through 370-10 included in the 1-1 signal transmission means.

A reference signal bus 390-1 of the 2-1 signal transmission means transmits a reference signal IREF generated by the first source driver SDR1 350-1 of the first source driver block 350 to the second source driver SDR2 350-2 that is serially cascaded to the first source driver SDR1 350-1. A reference signal bus 390-2 of the 2-1 signal transmission means may transmit a reference signal IREF generated by the second source driver SDR2 350-2 to the third source driver SDR3 350-3 that is serially cascaded to the second source driver SDR2 350-2.

Reference signal buses 400-1 and 400-2 of the 2-2 signal transmission means transmit reference signals to the respective source drivers that are serially cascaded in the same manner as the reference signal buses 390-1 and 390-2 included in the 2-1 signal transmission means.

In the bus link as illustrated in FIG. 3, each of the source drivers SDR1, SDR2, and SDR3 350-1, 350-2, and 350-3 of the first source driver block 350 and the source drivers SDL1, SDL2, and SDL3 360-1, 360-2, and 360-3 of the second source driver block 360 may need a reception circuit for receiving the data D1, D2, or D3, the clock signal CLK, and the first control signal DIO, but does not need a transmission circuit for transmitting them. Furthermore, each of the source drivers SDR1, SDR2, and SDR3 350-1, 350-2, and 350-3 and the source drivers SDL1, SDL2, and SDL3 360-1, 360-2, and 360-3 does not need a DLL circuit for reproducing the clock signal CLK. Therefore, each of the source drivers 350-1, 350-2, and 350-3 and 360-1, 360-2, and 360-3 includes a simplified circuit, resulting in a reduction in circuit size and power consumption.

As illustrated in FIGS. 2 and 3, the some embodiments of the present invention may transmit a reference signal IREF to each source driver using a serial cascade connection link for the following reason. If a timing controller transmits the reference signal IREF to each source driver, the number of pins of the timing controller increases and the length of the reference signal increases, which causes an increase in noise. If the reference signal IREF is transmitted to each source driver through a single pin of the timing controller, a reference current of each source driver changes due to load variations of each source driver.

Therefore, some embodiments of the present invention transmit the reference signal IREF to each source driver using the serial cascade connection link in order to improve the disadvantages mentioned above.

Figure 4:
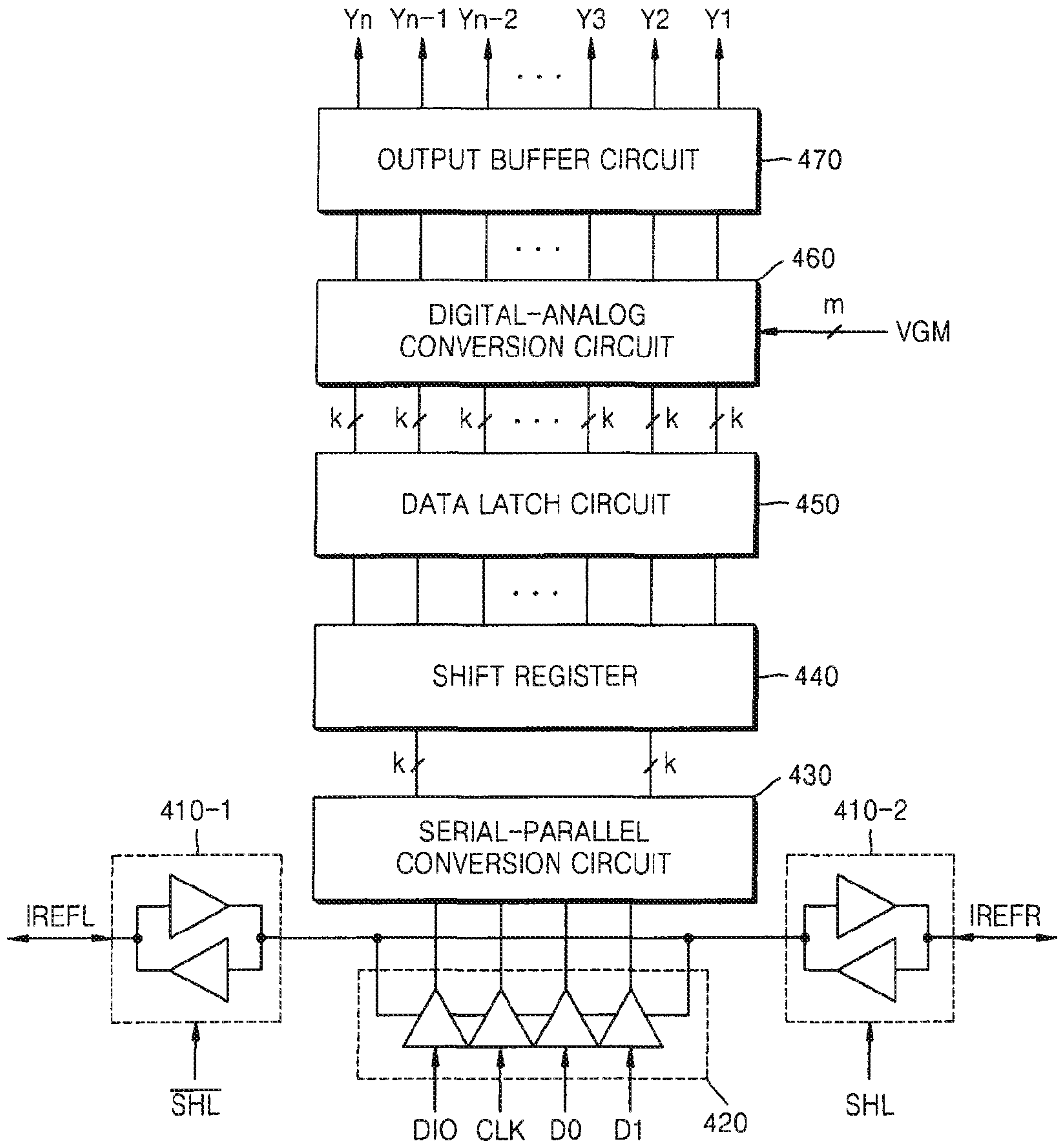
FIG. 4 is a block diagram of a source driver illustrated in FIGS. 2 and 3 according to an embodiment of the present invention.

FIG. 4 is a block diagram of the source driver illustrated in FIGS. 2 and 3 according to an embodiment of the present invention. Referring to FIG. 4, the source driver may comprise first and second bi-directional buffers 410-1 and 410-2, a reception circuit 420, a serial-parallel conversion circuit 430, a shift register 440, a data latch circuit 450, a digital-analog conversion circuit 460, and an output buffer circuit 470.

A transmission direction of the reference signal IREF in the first and second bi-directional buffers 410-1 and 410-2 may be determined based on the logic state of control signals SHL and SHL_bar (hereinafter referred to as "SHLB") that are output from the timing controller 220 or 320. That is, the transmission direction of the reference signal IREF between source drivers that are serially cascaded is determined based on the logic state of control signals SHL and SHLB.

The reception circuit 420 may receive the data D0 and D1, the clock signal CLK, and the first control signal DIO based on the reference signal IREF that is applied from the first bi-directional buffer 410-1 or the second bi-directional buffer 410-2, and may output the received signals to the serial-parallel conversion circuit 430.

The serial-parallel conversion circuit 430 may convert the received serial data into parallel data using the clock signal CLK, and the first control signal DIO. The data latch circuit 450 may latch the parallel data that was converted in the serial-parallel conversion circuit 430. The digital-analog conversion circuit 460 may convert the latched digital data into analog signals responsive to a gamma compensation signal VGM. The analog signals may be applied to data lines of the display panel 210 or 310 through the output buffer circuit 470.

The operation of transmitting/receiving the reference signal IREF in the source drivers illustrated in FIGS. 2 and 3 will now be described with reference to FIG. 5.

Figure 5:
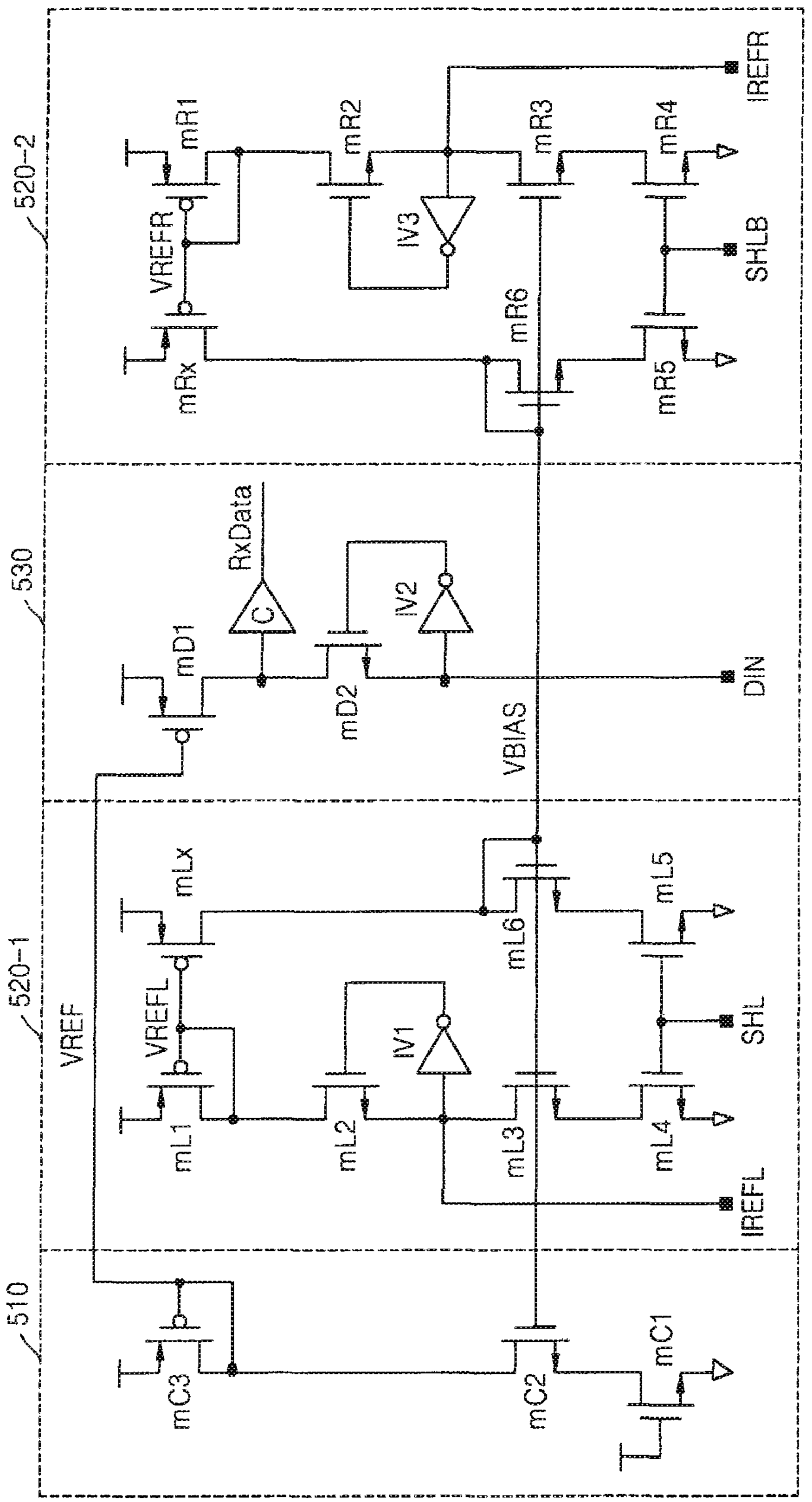
FIG. 5 is a circuit diagram including a reference signal transmission/reception circuit and a data reception circuit of the source driver illustrated in FIGS. 2 and 3 according to an embodiment of the present invention.

FIG. 5 is a circuit diagram of a reference signal transmission/reception circuit and a data reception circuit of the source driver illustrated in FIGS. 2 and 3, according to an embodiment of the present invention. Referring to FIG. 5, the reference signal transmission/reception circuit may comprise a copy circuit block 510, first and second reference signal channel circuit blocks 520-1 and 520-2, and a data channel circuit block 530.

The first and second reference signal channel circuit blocks 520-1 and 520-2 serve as a transmission circuit or a reception circuit according to the logic state of the control signal SHL. That is, the transmission direction of the reference signal IREF may be determined according to the logic state of the control signal SHL.

The control signal SHL at a low logic state will now be described. If the control signal SHL is at a low logic state, terminals IREFL and IREFR are, respectively, input and output terminals of the reference signal IREF (hereinafter referred to "reference current"). NMOS transistors mL4 and mL5 are turned off.

If the reference current is input into the terminal IREFL, the reference current is buffered in a buffer circuit comprising an inverter IV1 and an NMOS transistor mL2. The inverters IV1, IV2, and IV3 can be realized as pairs of PMOS transistors and NMOS transistors.

Therefore, a current equivalent to the reference current that was input into the terminal IREFL flows into a drain terminal of a PMOS transistor mLx through a current mirror circuit comprising PMOS transistors mL1 and mLx.

A bias voltage VBIAS may be generated in a gate terminal of an NMOS transistor mR6 from the current that flows into the drain terminal of the PMOS transistor mLx. The NMOS transistor mR6 is turned ON and becomes conductive due to the bias voltage VBIAS. Since the control signal SHL is at a low logic state, a control signal SHLB becomes logic high and NMOS transistors mR4 and mR5 are turned ON and become conductive. And since the terminal IREFR is determined as the output terminal at a low logic state of the control signal SHL, buffer circuits IV3 and mR2 are turned off and PMOS transistors mRx and mR1 are also turned off. Therefore, the current that flows into the drain terminal of the PMOS transistor mLx flows into a source terminal of the NMOS transistor mR6.

An NMOS transistor mR3 and the NMOS transistor mR6 are current mirror circuits, so that the same current as the current that flows into the source terminal of the NMOS transistor mR6 is mirrored and flows into a source terminal of the NMOS transistor mR3. Therefore, the same current as the current that flows into the source terminal of the NMOS transistor mR3 flows into the terminal IREFR.

As a result, the reference current that is input into the terminal IREFL of a source driver is output to the terminal IREFR and is transmitted to another source driver that is serially cascaded to the source driver.

NMOS transistors mC2 and mC1 and the NMOS transistors mR5 and mR6 are current mirror circuits, so that the same current as the current that flows into the source terminal of the NMOS transistor mR6 is mirrored and flows into a source terminal of the NMOS transistor mC2. Similarly, PMOS transistors mC3 and mD1 are current mirror circuits, so that the same current as the current that flows into a drain terminal of the PMOS transistor mC3 is mirrored and flows into a drain terminal of the PMOS transistor mD1.

Therefore, the data channel circuit block 530 detects data obtained by comparing a data current that is input into a data input terminal DIN through a buffer circuit comprising the inverter IV2 and an NMOS transistor mD2 with the reference current that flows into the drain terminal of the PMOS transistor mD1 in a comparator C, and outputs the detected data to a terminal RxData.

The control signal SHL at a high logic state will now be described. If the control signal SHL is at a high logic state, the terminals IREFR and IREFL are input and output terminals of the reference signal IREF (hereinafter referred to "reference current"), respectively. The control signal SHLB is at a low logic state, so that the NMOS transistors mR4 and mR5 are turned off.

If the reference current is input into the terminal IREFR, the reference current is buffered in a buffer circuit comprising the inverter IV3 and an the NMOS transistor mR2. Therefore, the reference current that is input into the terminal IREFR through a current mirror circuit comprising the PMOS transistors mR1 and mRx is mirrored and flows into a drain terminal of the PMOS transistor mRx.

The bias voltage VBIAS may be generated in a gate terminal of an NMOS transistor mL6 from the current that flows into the drain terminal of the PMOS transistor mRx. The NMOS transistor mL6 is turned ON and becomes conductive by means of the bias voltage VBIAS.

Since the control signal SHL is at a high logic state, the NMOS transistors mL4 and mL5 are turned ON and become conductive. And since the terminal IREFL is determined as the output terminal at a high logic state of the control signal SHL, the buffer circuits IV1 and mL2 are turned off and the PMOS transistors mLx and mL1 are also turned off. Therefore, the current that flows into the drain terminal of the PMOS transistor mRx flows into a source terminal of the NMOS transistor mL6.

An NMOS transistor mL3 and the NMOS transistor mL6 are current mirror circuits, so that the same current as the current that flows into the source terminal of the NMOS transistor mL6 is mirrored and flows into a source terminal of the NMOS transistor mL3. Therefore, the same current as the current that flows into the source terminal of the NMOS transistor mL3 flows into the terminal IREFL.

As a result, the reference current that is input into the terminal IREFR of a source driver is output to the terminal IREFL and is transmitted to another source driver that is serially cascaded to the source driver.

The NMOS transistors mC2 and mC1 and the NMOS transistors mL6 and mL5 are current mirror circuits, so that the same current as the current that flows into the source terminal of the NMOS transistor mL6 is mirrored and flows into the source terminal of the NMOS transistor mC2. Similarly, the PMOS transistors mC3 and mD1 are current mirror circuits, so that the same current as the current that flows into a drain terminal of the PMOS transistor mC3 is mirrored and flows into a drain terminal of the PMOS transistor mD1.

Therefore, the data channel circuit block 530 detects data obtained by comparing a data current that is input into the data input terminal DIN through the buffer circuit comprising the inverter IV2 and an NMOS transistor mD2 with the reference current that flows into the drain terminal of the PMOS transistor mD1 in the comparator C, and outputs the detected data to the terminal RxData.

Figure 6:
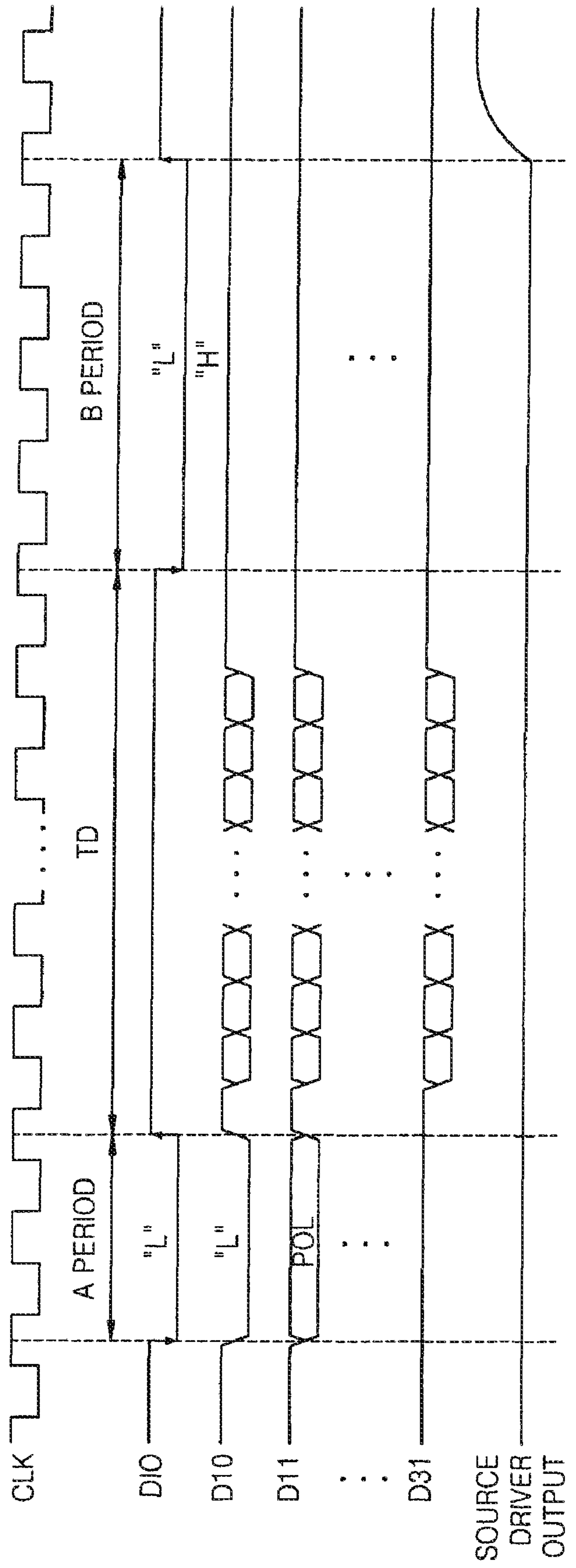
FIG. 6 is a timing diagram of main signals of the apparatus for driving the display panel according to an embodiment of the present invention.

The operation of the source drivers illustrated in FIG. 2 will now be described with reference to FIGS. 4 and 6. FIG. 6 is a timing diagram of main signals of the apparatus for driving the display panel according to an embodiment of the present invention. Each of the data buses of the source drivers may comprise a plurality of data lines D10 through D31.

During a period A, the timing controller 220 may output the clock signal CLK, the first control signal DIO, a second control signal, and a polarity control signal POL. The first control signal DIO may be used to notify a start location of display data. The second control signal may be transmitted to the first source driver 250-1 through the data line D10 among the plurality of data lines D10 through D31. The polarity control signal POL may be used to invert the polarity of data, and may be transmitted to the first source driver 250-1 through a specific data line (the data line D11 in FIG. 6) during a period when data is not transmitted.

During the period A, the timing controller 220 may transmit the clock signal CLK to each of the source drivers 250-1, 250-2, and 250-3 through the clocks buses 260-2, 260-5, and 260-8 that are directly coupled to the source drivers 250-1, 250-2, and 250-3, respectively. The timing controller 220 may also transmit the first control signal DIO at a low logic state L to each of the source drivers 250-1, 250-2, and 250-3 through the control buses 260-3, 260-6, and 260-9, respectively. The timing controller 220 may also transmit the second control signal at a low logic state L to the first source driver 250-1 through the data line D10 comprising the data bus 260-4, and may transmit the polarity control signal POL to the first source driver 250-1 through the data line D11 comprising the data bus 260-4.

During the period A, a combination of the first control signal DIO at a low logic state L and the second control signal at a low logic state L may be determined as a data start signal. The polarity control signal POL may be used to determine output polarity of the display data that is latched by the source drivers.

During a display data transmission period TD, the timing controller 220 may transmit the clock signal CLK to each of the source drivers 250-1, 250-2, and 250-3 through the clocks buses 260-2, 260-5, and 260-8. The timing controller 220 may also transmit the first control signal DIO at a high logic state H to each of the source drivers 250-1, 250-2, and 250-3 through the control buses 260-3, 260-6, and 260-9, respectively, and may transmit the display data D10 through D31 through the data buses 260-4, 260-7, and 260-10, respectively.

The display data that are transmitted to each of the source drivers 250-1, 250-2, and 250-3 at the above time may be synchronized with rising and falling edges. Furthermore, the display data may be stored. If the display data that is allocated to each of the source drivers 250-1, 250-2, and 250-3 is completely stored in each of the source drivers 250-1, 250-2, and 250-3, the timing controller 220 may output the first control signal DIO at a low logic state L and the second control signal at a high logic state H to each of the source drivers 250-1, 250-2, and 250-3 during a period B.

Therefore, the digital data stored in each of the source drivers 250-1, 250-2, and 250-3 may be converted into analog signals responsive to the first control signal DIO at a low logic state L and the second control signal at a high logic state H, and may be applied to the data lines of the display panel 210 or 310. The data and the clock signal CLK generated in the timing controller 220 may be controlled to have a 90° phase difference therebetween.

Figure 7:
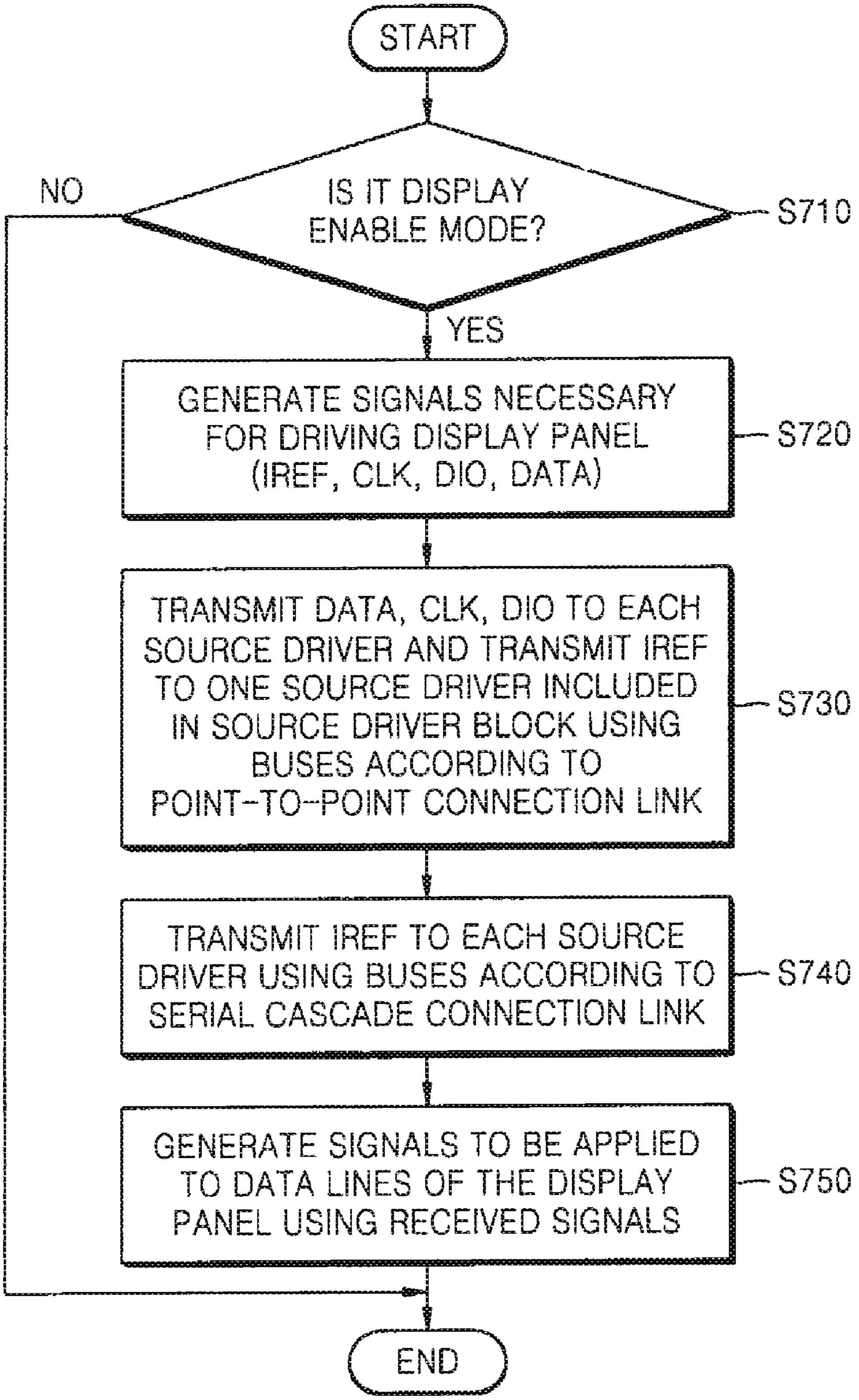
FIG. 7 is a flowchart illustrating a method of driving a display panel according to an embodiment of the present invention.

A method of driving a display panel according to some embodiments of the present invention will now be described with reference to FIG. 7. FIG. 7 is a flowchart illustrating the method of driving the display panel according to an embodiment of the present invention. Referring to FIG. 7, at operation S710, a timing controller determines whether a display apparatus is in a display enable mode. In the display enable mode, power may be supplied to the display apparatus.

If it is determined that the display apparatus is in the display enable mode, at operation S720 the timing controller generates signals necessary for driving the display panel. Data, a clock signal CLK, a reference signal IREF, and a first control signal DIO may be used to drive the display panel.

At operation S730, the signals generated in the timing controller such as the data, the clock signal CLK, and the first control signal DIO may be directly transmitted to each source driver of a source driver block through buses using a point-to-point connection link, and the reference signal IREF may be transmitted to each source driver of the source driver block through a reference signal bus that is coupled to one of source drivers of the source driver block.

At operation S740, each source driver of the source driver block may transmit the reference signal IREF to each source driver through buses using a serial cascade connection link. In more detail, each source driver that receives the reference signal IREF from the timing controller in Operation 730 may sequentially transmit the reference signal IREF to all source drivers of the source driver block through buses using the serial cascade connection link.

At operation S750, each source driver may generate signals to be applied to data lines of the display panel using the received signals in operations S730 and S740.

When the display panel is driven according to the bus link of embodiments of the present invention, the number of transmission circuits and reception circuits of each source driver is reduced compared to the prior art. A DLL circuit for reproducing the clock signal CLK can be removed, thereby reducing the number of logic power circuits.

Figure 1:
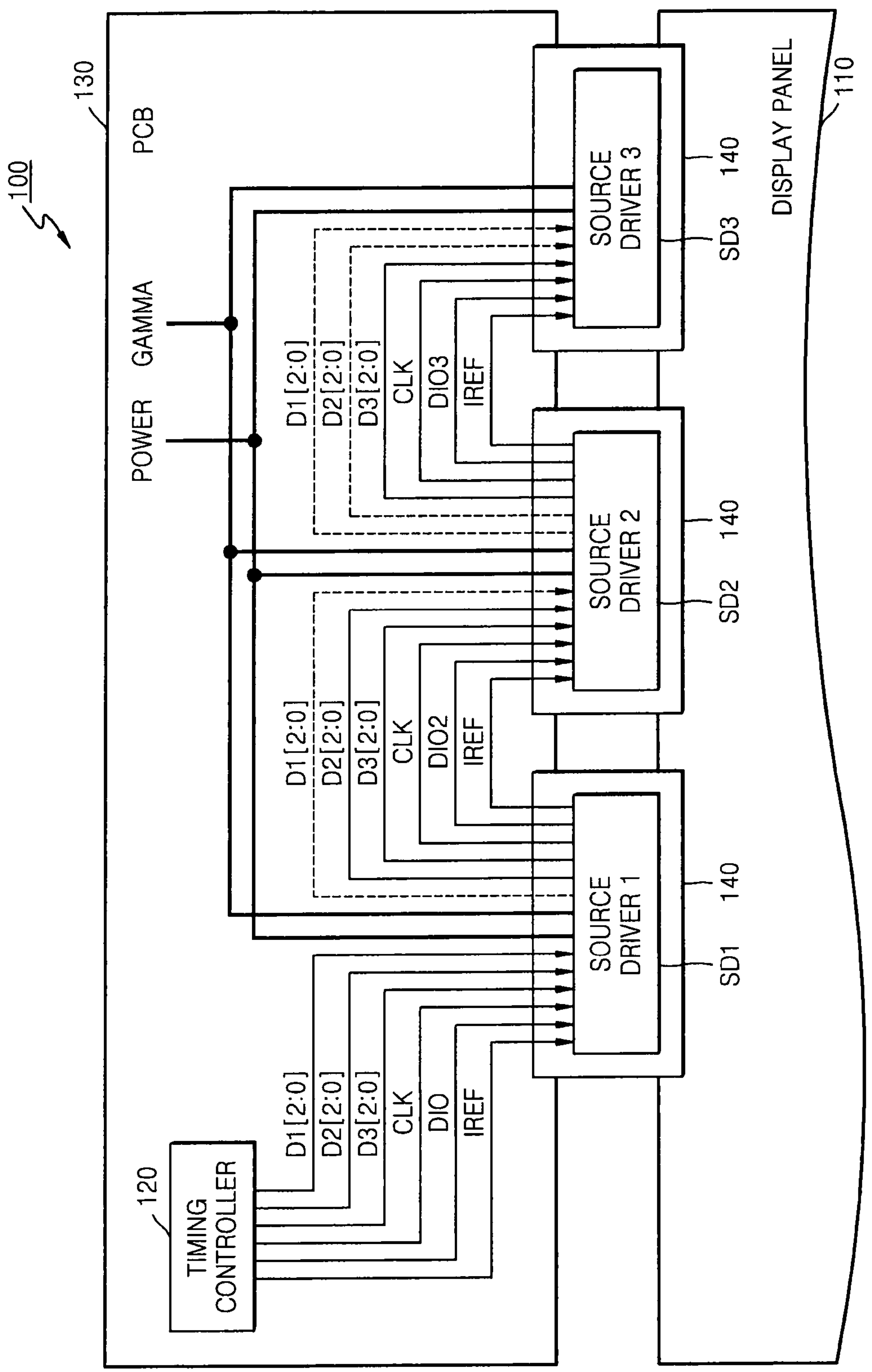
FIG. 1 (PRIOR ART)
FIG. 1 is a circuit diagram of a conventional apparatus for driving a display panel.

Referring to Table 1, the present invention and the prior art are compared in terms of the number of transmission circuits Tx and reception circuits Rx that are needed for each source driver and the number of logic power circuits that are needed when the prior art drives a liquid crystal display (LCD) panel using four source drivers using the cascade connection link as illustrated in FIG. 1. This is compared to the present invention driving the LCD panel using four source drivers using the point-to-point connection link as illustrated in FIG. 2.

TABLE 1

| | | Prior Art (FIG. 1) | | Present Invention | | |
|---|---|---|---|---|---|---|
| | | Tx | Rx | Tx | Rx | Remarks |
| Number | Per Source Driver | 9 | 11 | 1 | 5 | Reduced by about 55% |
| Power | Source Driver | 42 | 64 | 6 | 40 | Reduced by |
| | Timing Controller | 22 | 0 | 34 | 0 | about 37.5% |
| | Total | 64 | 64 | 40 | 40 | |

According to embodiments of the present invention, a bus system of an apparatus for driving a display panel is designed so that data is directly transmitted from a timing controller to each source driver using buses according to a point-to-point connection link, and a reference signal is transmitted between source drivers using buses according to a serial cascade connection link, thereby simplifying a circuit of each source driver and reducing the area of each source driver chip, and further reducing the number of logic power circuits.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for driving a display panel, comprising:

a timing controller structured to generate a first signal, second signals, and a third signal to drive the display panel;

a plurality of source drivers structured to drive data lines of the display panel, at least a first source driver of the source drivers being structured to directly receive the first signal from the timing controller when the third signal is in a first logic state;

at least one point-to-point connection link directly coupling each of the plurality of source drivers to the timing controller, the at least one point-to-point connection link structured to transmit the second signals;

at least one serial cascade connection link cascaded between the first source driver and a second source driver, the at least one serial cascade connection link structured to transmit the first signal from the first source driver to the second source driver when the third signal is in the first logic state, wherein the timing controller is structured to directly transmit the second signals to each of the plurality of source drivers.

2. The apparatus of claim 1, wherein the first signal is a reference signal and the second signals include data signals, and wherein the plurality of source drivers are structured to drive the data lines of the display panel responsive to the first signal and the second signals.

3. The apparatus of claim 2, further comprising:

first signal transmission means comprising buses for transmitting the second signals including the data signals from the timing controller to each of the plurality of source drivers using the at least one point-to-point connection link, and a bus for transmitting the reference signal generated by the timing controller to one of the plurality of source drivers; and second signal transmission means comprising buses for transmitting the reference signal between the source drivers of the plurality of source drivers using the at least one serial cascade connection link.

4. The apparatus of claim 3, wherein the second signals include a clock signal and a first control signal, and wherein the first signal transmission means further comprises:

buses for transmitting the second signals including the clock signal and the first control signal between the timing controller and each of the plurality of source drivers using the at least one point-to-point connection link.

5. The apparatus of claim 4, wherein the first control signal comprises a data start signal.

6. The apparatus of claim 4, wherein the timing controller is structured to control a phase between the data signals and the clock signal so that a phase difference between the data signals and the clock signal maintains a predefined value other than 0.

7. The apparatus of claim 6, wherein the maintained predefined value is 90°.

8. The apparatus of claim 2, wherein the reference signal comprises a reference current signal.

9. The apparatus of claim 1, wherein each of the plurality of source drivers comprises a reception circuit structured to receive the second signals, and a transmission/reception circuit structured to transmit/receive the first signal.

10. The apparatus of claim 1, wherein each of the plurality of source drivers comprises:

at least two transmission/reception circuits structured to transmit/receive the first signal;

a copy circuit structured to copy the first signal received through at least one of the transmission/reception circuits and to generate a reference voltage equivalent to the copied first signal; and a data reception circuit structured to detect the second signals directly transmitted from the timing controller using the reference voltage generated by the copy circuit.

11. The apparatus of claim 1, wherein each of the third signals comprises a control signal that controls whether the first signal is received or output.

12. The apparatus of claim 1, wherein a first terminal of the first source driver is structured to directly receive the first signal from the timing controller when the third signal is in the first logic state, and a second terminal of the first source driver is structured to transmit the first signal to a first terminal of the second source driver when the third signal is in the first logic state.

13. An apparatus for driving a display panel, comprising:

a first group of buses structured to transmit first display data between a timing controller and a first source driver, the first display data being driven by the first source driver through one or more data lines coupled to the display panel;

a single bus structured to transmit a reference signal between the timing controller and the first source driver;

second through an nth groups of buses structured to directly transmit second through nth display data, respectively, between the timing controller and each of second through nth source drivers, the second through nth display data being respectively driven by the second through nth source drivers through the one or more data lines coupled to the display panel;

control buses structured to directly transmit respective control signals between the timing controller and each of first through nth source drivers;

a first cascaded bus structured to transmit the referenCe signal from the first source driver to the second source driver that is serially cascaded to the first source driver; and second through (n−1)th cascaded buses structured to transmit the respective reference signals reproduced in second through (n−1)th source drivers, wherein for each source driver, a reference signal is input when the respective control signal is in a first logic state and a reference signal is output when the respective control signal is in the first logic state.

14. The apparatus of claim 13, further comprising:

a group of clock buses, each clock bus structured to directly transmit a clock signal between the timing controller and one of the source drivers.

15. The apparatus of claim 13, wherein the source drivers include a chip-on film (COF) structure, and wherein the source drivers are structured to be mounted on a film coupled to a printed circuit board (PCB) on which the timing controller is mounted, the film being coupled to the display panel.

16. The apparatus of claim 13, wherein the source drivers include a chip-on glass (COG) structure, and wherein the source drivers are structured to be mounted on a glass coupled to a printed circuit board (PCB) on which the timing controller is mounted, the glass being coupled to the display panel.

17. The apparatus of claim 13, wherein the respective control signals include a normal control signal and a complementary control signal.

18. The apparatus of claim 13, wherein a first terminal of the first source driver is structured to directly receive the reference signal from the timing controller when the respective control signals are in the first logic state, and a second terminal of the first source driver is structured to transmit the reference signal to a first terminal of the second source driver when the respective control signals are in the first logic state.

19. An apparatus for driving a display panel, comprising:

a timing controller structured to generate signals including data, a first reference signal, a second reference signal, first control signals, and second control signals to drive the display panel at a display driving time;

a first source driver block comprising a plurality of source drivers structured to generate signals to drive data lines of the display panel using the signals generated by the timing controller;

a second source driver block comprising a plurality of source drivers structured to generate signals to drive data lines of the display panel using the signals generated by the timing controller;

a first signal transmission means comprising buses for transmitting the data from the timing controller to each of the plurality of source drivers of the first source driver block using a point-to-point connection link, and a bus for transmitting the first reference signal generated by the timing controller to one of the plurality of source drivers of the first source driver block;

a second signal transmission means comprising buses for transmitting the data from the timing controller to each of the plurality of source drivers of the second source driver block using the point-to-point connection link, and a bus for transmitting the second reference signal generated by the timing controller to one of the plurality of source drivers of the second source driver block;

a third signal transmission means comprising buses for transmitting the first reference signal between the plurality of source drivers of the first source driver block using a serial cascade connection link; and a fourth signal transmission means comprising buses for transmitting the second reference signal between the plurality of source drivers of the second source driver block using the serial cascade connection link, wherein the apparatus is structured such that the first control signals are transmitted from the timing controller to the plurality of source drivers of the first source driver block, respectively, wherein the apparatus is structured such that the second control signals are transmitted from the timing controller to the plurality of source drivers of the second source driver block, respectively, wherein the first source driver block is structured such that the first reference signal is input when the respective first control signals are in a first logic state and the first reference signal is output when the respective first control signals are in the first logic state, and wherein the second source driver block is structured such that the second reference signal is input when the respective second control signals are in a first logic state and the second reference signal is output when the respective second control signals are in the first logic state.

20. The apparatus of claim 19, wherein the first signal transmission means further comprises:

buses for transmitting a first clock signal and a first data start signal from the timing controller to each of the plurality of source drivers of the first source driver block using the point-to-point connection link, wherein the second signal transmission means further comprises:

buses for transmitting a second clock signal and a second data start signal from the timing controller to each of the plurality of source drivers of the second source driver block using the point-to-point connection link.

21. The apparatus of claim 19, wherein the first source driver block and the second source driver block are disposed between the display panel and the PCB and have the timing controller therebetween in order to symmetrically face each other.

22. The apparatus of claim 19, wherein the first control signals include a normal control signal and a complementary control signal, and the second control signals include a normal control signal and a complementary control signal.

23. The apparatus of claim 19, wherein a first terminal of a first source driver of the first source driver block is structured to directly receive the first reference signal from the timing controller when the respective first control signals are in the first logic state, and a second terminal of the first source driver of the first source driver block is structured to transmit the first reference signal to a first terminal of a second source driver of the first source driver block when the respective first control signals are in the first logic state, and wherein a first terminal of a first source driver of the second source driver block is structured to directly receive the second reference signal from the timing controller when the respective second control signals are in the first logic state, and a second terminal of the first source driver of the second source driver block is structured to transmit the second reference signal to a first terminal of a second source driver of the second source driver block when the respective second control signals are in the first logic state.

* * * * *